(12) United States Patent
Willett, Jr. et al.

(10) Patent No.: US 8,894,372 B2
(45) Date of Patent: Nov. 25, 2014

(54) TURBINE ROTOR INSERT AND RELATED METHOD OF INSTALLATION

(75) Inventors: Fred Thomas Willett, Jr., Burnt Hills, NY (US); Laurence Scott Duclos, Thorndike, ME (US); Michael Dennis Mack, Ballston Spa, NY (US); Timothy Scott McMurray, Fultonville, NY (US); Roy Paul Swintek, Altamont, NY (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 13/333,445

(22) Filed: Dec. 21, 2011

(65) Prior Publication Data

US 2013/0164138 A1  Jun. 27, 2013

(51) Int. Cl.
    *F01D 5/32*  (2006.01)
(52) U.S. Cl.
    USPC ........................ 416/220 R; 416/248
(58) Field of Classification Search
    CPC .......... F01D 5/303; F01D 5/3038; F01D 5/32
    USPC ...................... 416/215, 216, 218, 220 R, 248
    See application file for complete search history.

(56) References Cited

U.S. PATENT DOCUMENTS

| | | | |
|---|---|---|---|
| 883,926 A | 4/1908 | Alexander et al. | |
| 2,199,243 A | 4/1940 | Mortimer | |
| 3,088,708 A * | 5/1963 | Feinberg | 416/215 |
| 3,216,700 A * | 11/1965 | Bostock, Jr. | 416/216 |
| 3,501,249 A | 3/1970 | Scalzo et al. | |
| 3,721,506 A * | 3/1973 | Anderson | 416/215 |
| 3,904,316 A * | 9/1975 | Clingman et al. | 416/218 |
| 4,094,615 A | 6/1978 | Glenn | |
| 4,523,890 A | 6/1985 | Thompson | |
| 4,702,673 A | 10/1987 | Hansen et al. | |
| 4,797,065 A | 1/1989 | Conlow | |
| 4,859,149 A * | 8/1989 | McClain | 416/215 |
| 4,895,490 A | 1/1990 | Kasperski | |
| 5,518,369 A | 5/1996 | Modafferi | |
| 5,913,660 A | 6/1999 | Knott | |
| 5,984,639 A | 11/1999 | Gekht et al. | |
| 6,109,877 A | 8/2000 | Gekht et al. | |
| 6,398,500 B2 | 6/2002 | Pedersen et al. | |
| 7,261,518 B2 | 8/2007 | Golinkin et al. | |
| 7,901,187 B2 | 3/2011 | Barber | |

FOREIGN PATENT DOCUMENTS

| | | |
|---|---|---|
| DE | 740774 C | 10/1943 |
| DE | 1024198 B | 2/1958 |
| GB | 703173 A | 1/1954 |

OTHER PUBLICATIONS

Combined Search and Examination Report from GB Application No. 1222235.2 dated Apr. 19, 2013.

* cited by examiner

*Primary Examiner* — Ninh H Nguyen

(74) *Attorney, Agent, or Firm* — Ernest G. Cusick; Hoffman Warnick LLC

(57) ABSTRACT

Systems, methods and devices adapted to ease installation of turbine bucket assemblies about a rotor and to reduce related stress concentrations in the rotor are disclosed. In one embodiment, an insert includes: a base portion adapted to complement an entry slot in a rotor of a turbine; and a neck portion extending radially outboard from the base portion, the neck portion adapted to complement a post of the rotor to form a substantially continuous dovetail about the rotor.

12 Claims, 13 Drawing Sheets

TURBINE ROTOR INSERT AND RELATED METHOD OF INSTALLATION

BACKGROUND OF THE INVENTION

The subject matter disclosed herein relates to turbines and, more particularly, to the installation and retention of tangential dovetail buckets in a turbine rotor.

Some power plant systems, for example certain nuclear, simple cycle and combined cycle power plant systems, employ turbines in their design and operation. Some of these turbines include rotors (e.g., a drum rotor, a wheel and diaphragm rotor, etc.) employing a plurality of tangential dovetail buckets. These buckets are installed circumferentially about the rotor via a set of entry slots in the rotor posts. Once installed, due to the extreme environmental conditions which exist within the turbine during operation, these buckets must be secured and the entry slots must be sealed. Some systems rely on a closure bucket to secure the turbine buckets in place about the rotor and to seal the entry slot. During installation, this closure bucket is the last bucket to be installed in each given stage. Once the closure bucket is in place in the entry slot, a set of grub screws are used to securely affix the closure bucket to the rotor, thereby locking in the other turbine buckets and sealing the entry slot. However, these grub screws may be difficult to install and/or tighten, and the requisite grub screw holes which must be formed in the rotor to accommodate these grub screws may result in stress concentrations in the rotor.

Referring to FIG. 1, a schematic view of a known closure bucket 92 is shown connected to a rotor 20. Closure bucket 92 illustrated in FIG. 1 may include a bucket shank 90 and a vane/blade 91. Closure bucket 92 may be connected to rotor 20 via a set of grub screws 97 which are adapted to complement and connect with a set of apertures 21 in rotor 20, thereby securing closure bucket 92 to rotor 20.

BRIEF DESCRIPTION OF THE INVENTION

Systems and devices adapted to ease installation of turbine bucket assemblies about a rotor and to reduce related stress concentrations in the rotor are disclosed. In one embodiment, an insert includes: a base portion adapted to complement an entry slot in a rotor of a turbine; and a neck portion extending radially outboard from the base portion, the neck portion adapted to complement a post of the rotor to form a substantially continuous dovetail about the rotor.

A first aspect of the disclosure provides an insert including: a base portion adapted to complement an entry slot in a rotor of a turbine; and a neck portion extending radially outboard from the base portion, the neck portion adapted to complement a post of the rotor to form a substantially continuous dovetail about the rotor.

A second aspect provides a turbine including: a stator; a working fluid passage substantially surrounded by the stator; and a rotor configured radially inboard of the working fluid passage and defining a set of entry slots and a set of circumferential slots, the rotor including: a set of turbine buckets connected to the rotor via the set of circumferential slots; and a set of inserts adapted to complement the set of entry slots and substantially secure a position of the set of turbine buckets in the set of circumferential slots.

A third aspect provides a method including: installing a first set of turbine buckets in a first circumferential slot of a rotor via a first entry slot; installing a first insert in the first entry slot; installing a second set of turbine buckets in a second circumferential slot of the rotor via a second entry slot, the second circumferential slot being axially adjacent the first circumferential slot; installing a final set of turbine buckets in a final circumferential slot of the rotor via a final entry slot; and installing a final insert in the final entry slot.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
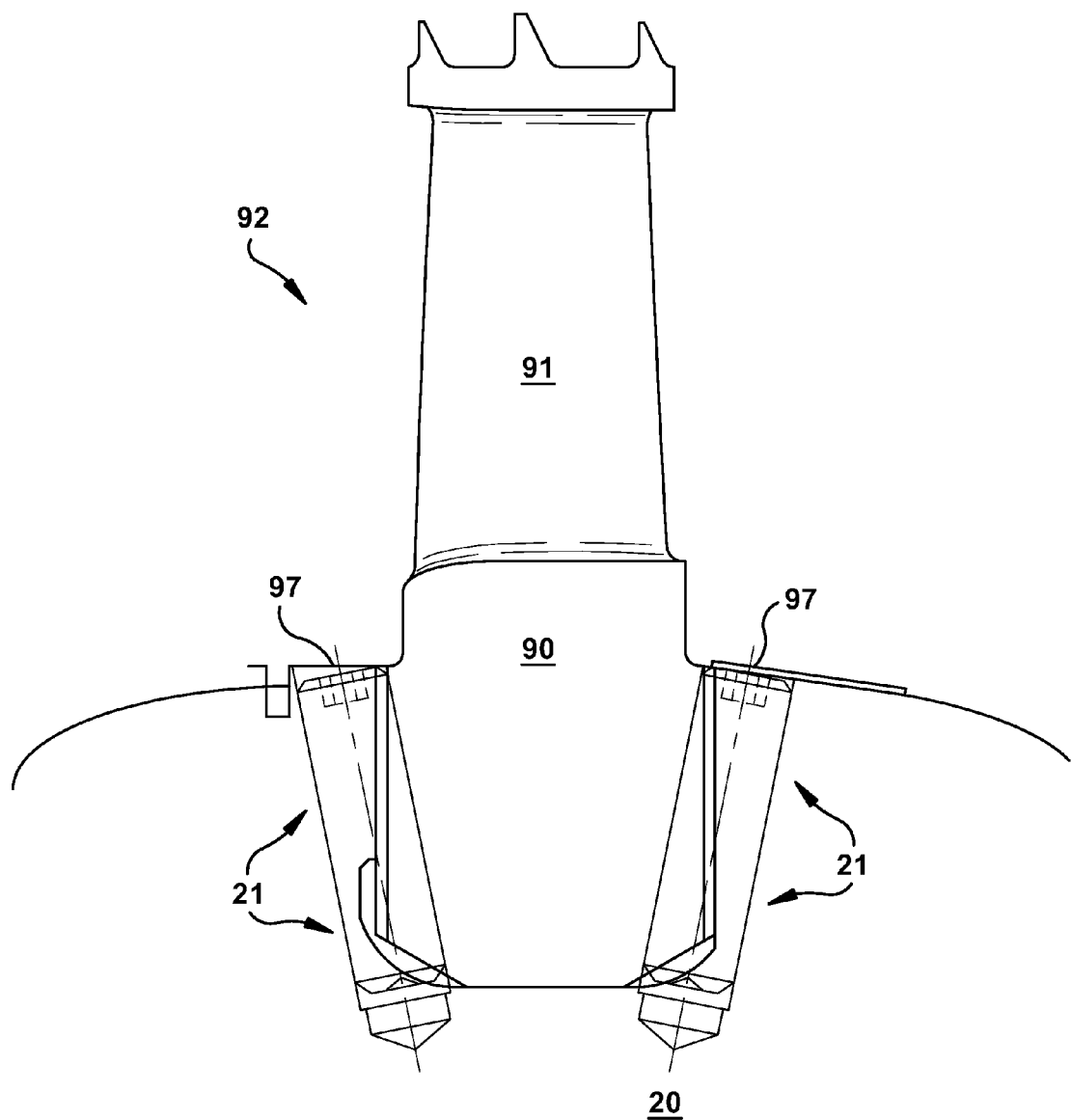
FIG. 1 shows a partial cut-away schematic view of a known closure bucket according to the prior art.
Figure 2:
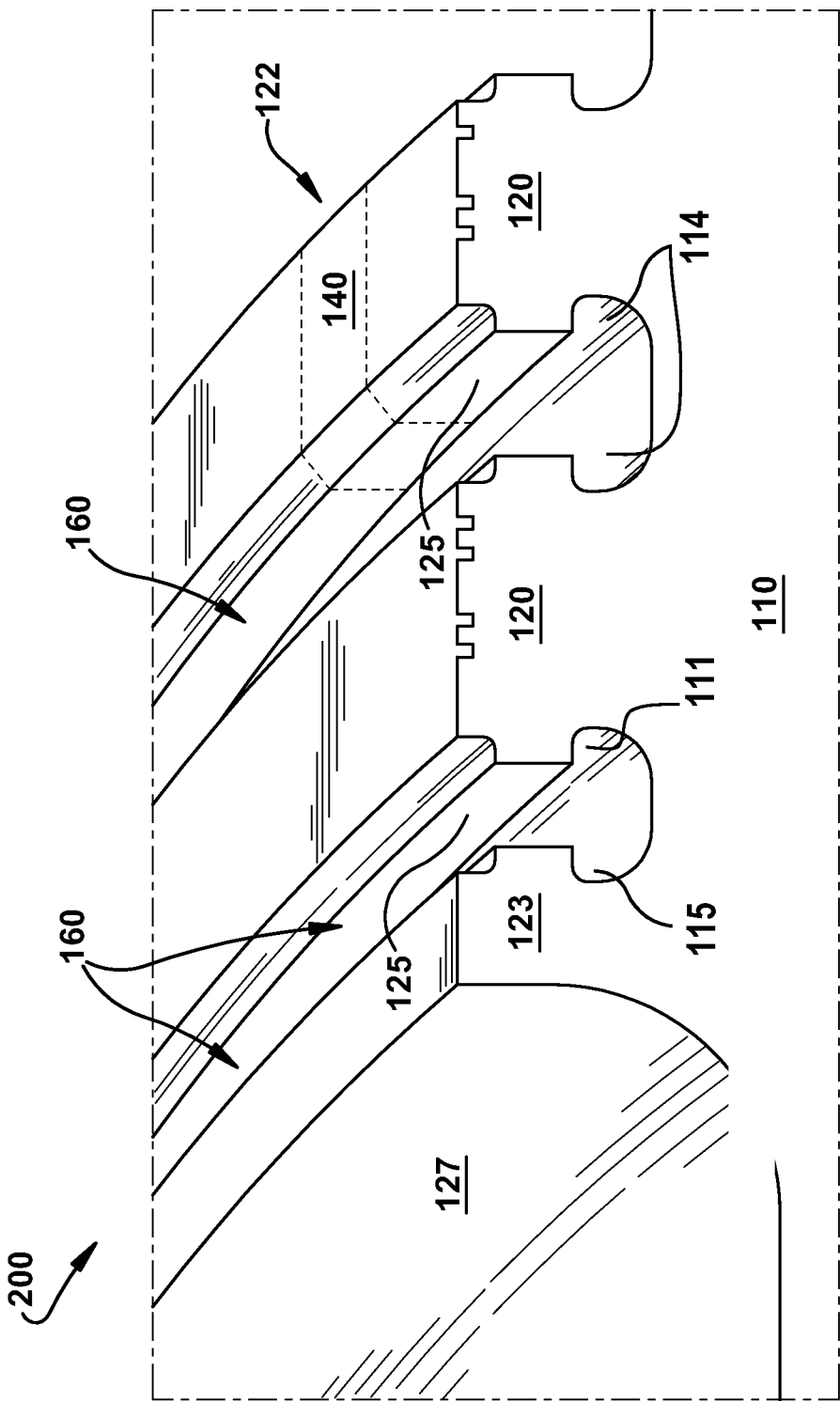
FIG. 2 shows a three-dimensional perspective view of portions of a turbine according to an embodiment of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, aspects of the invention provide for systems, methods and devices adapted to ease installation of turbine bucket assemblies about a rotor and to reduce related stress concentrations which may develop in the rotor during operation. The turbine buckets of these systems are installed in a circumferential slot about the rotor via an entry slot, and then are secured in position by an insert which is adapted to complement the entry slot.

In the art of power generation systems (including, e.g., nuclear reactors, steam turbines, gas turbines, etc.), turbines driven by high temperature fluids (e.g., steam) are often employed as part of the system. Some turbines include turbine bucket assemblies as a part of a rotor component which is used in part to generate power. The turbine buckets in these assemblies include bucket shanks and blades (airfoils), and are assembled into circumferential slots about the rotor via a set of dovetails which are adapted to complement the circumferential slots. During assembly, the turbine buckets are sequentially inserted into the circumferential slots via an axial or radial entry slot until a given circumferential slot has only one remaining bucket slot. The last turbine bucket to be installed in a given stage is then inserted through the entry slot and affixed to the rotor via a set of grub screws. This last turbine bucket is used to fill the entry slot and to secure all of the other turbine buckets in position about the rotor. However, the use of these grub screws may complicate maintenance and installation processes, and introduce a number of stress concentrations on the rotor.

Embodiments of the current invention provide for systems, methods and devices adapted to ease turbine bucket maintenance and installation, and to reduce stress concentrations in the rotor by using an insert to secure a position of the turbine buckets about the rotor. The insert is adapted to complement the entry slot and form a substantially continuous circumferential post about the rotor. The insert is radially and circumferentially constrained by the rotor post, and axially constrained by axially adjacent turbine buckets and/or rotor posts. This insert reduces the number of grub screws required for secure installation and reduces stress concentrations.

Turning to the FIGURES, embodiments of systems and assemblies including inserts are shown, where the inserts may impact rotor assembly processes and increase the life expectancy of the rotor, the turbine and the overall power generation system by reducing stress concentrations. Each of the components in the FIGURES may be connected via conventional means, e.g., via a common conduit or other known means as is indicated in FIGS. 2-13. Specifically, referring to FIG. 2, a three-dimensional perspective view of portions of a turbine 200 including a rotor 110 with a set of posts 120 is shown according to embodiments of the invention. Set of posts 120 define a set of circumferential slots 160 which are adapted to secure a plurality of turbine buckets 93 (shown in FIG. 9) about rotor 110. The set of posts 120 extend radially outboard from rotor 110 and define stages of turbine 200. Set of posts 120 include a set of axial ridges 125 which further secure turbine buckets 93 to rotor 110 by defining a set of hook slots 114 in set of circumferential slots 160. In one embodiment, set of hook slots 114 may include both an aft tangential dovetail slot 111 and a forward tangential dovetail slot 115. In one embodiment, an end post 123 on rotor 110 may include a substantially planar axial face 127. In one embodiment, at least one post 120 may include an entry slot 122 (shown in phantom) adapted to enable insertion of portions of turbine buckets 93 into set of circumferential slots 160. In one embodiment, bucket shank 90 of turbine bucket 93 is inserted through entry slot 122 and is slidingly received by circumferential slot 160. In one embodiment, an insert 140 may be inserted in entry slot 122, thereby forming a substantially continuous circumferential post 120 about rotor 110. In one embodiment, insert 140 and post 120 may form a substantially continuous axial ridge 125 about rotor 110, which forms a dovetail to accommodate bucket shank 90 and turbine bucket 93. In one embodiment, insert 140 may be retained in entry slot 122 via an axial dovetail.

Figure 3:
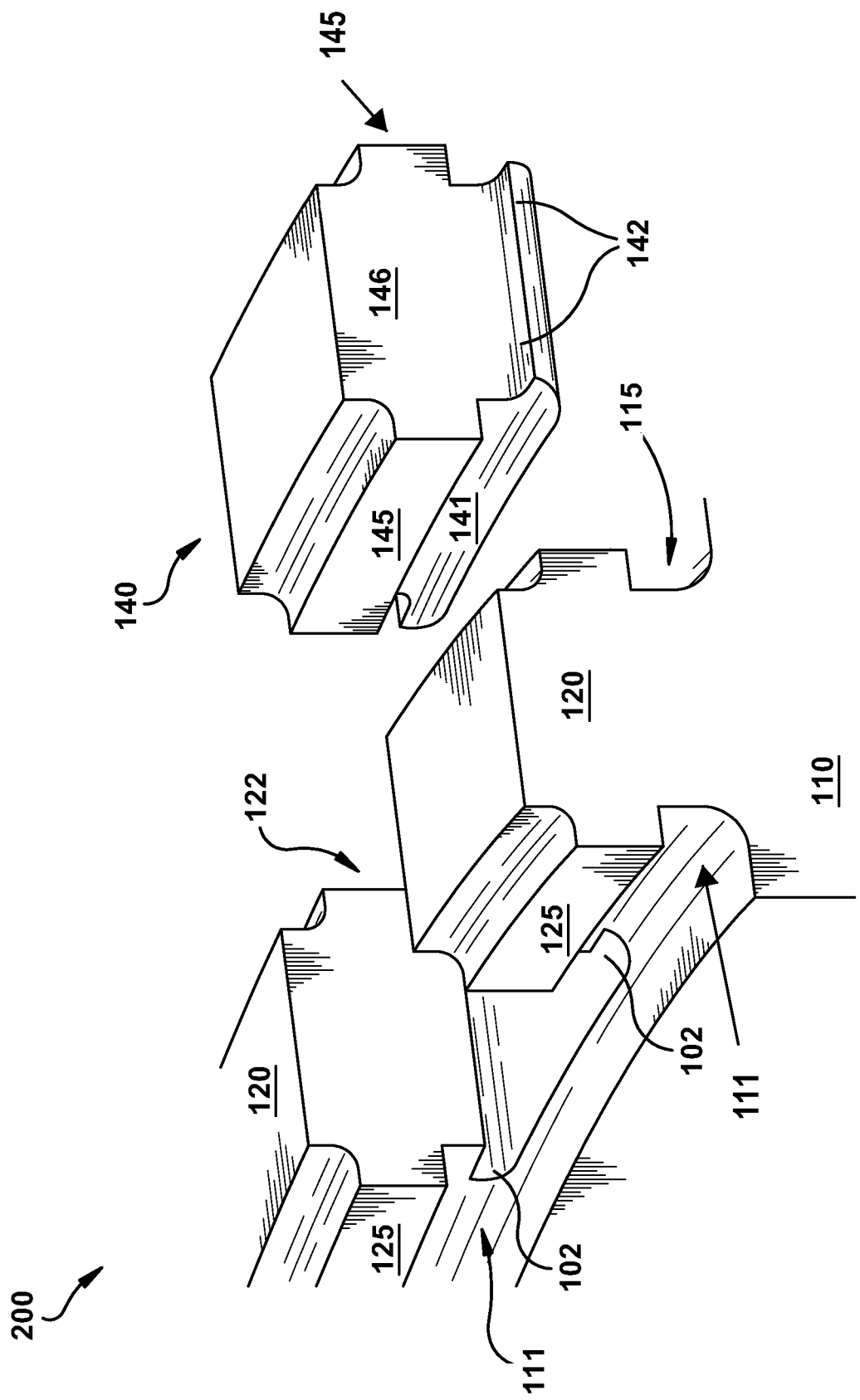
FIG. 3 shows a three-dimensional perspective view of portions of a turbine according to an embodiment of the invention.

Turning to FIG. 3, a three-dimensional perspective view of portions of turbine 200 including rotor 110 with post 120 is shown according to embodiments of the invention. It is understood that elements similarly numbered between FIG. 2 and FIG. 3 may be substantially similar as described with reference to FIG. 2. Further, in embodiments shown and described with reference to FIGS. 2-13, like numbering may represent like elements. Redundant explanation of these elements has been omitted for clarity. Finally, it is understood that the components of FIGS. 2-13 and their accompanying descriptions may be applied to any embodiment described herein.

Returning to FIG. 3, in this embodiment, insert 140 may include a base portion 141 and a neck portion 146 which extends radially outboard from base portion 141. In one embodiment, neck portion 146 may complement post 120 of rotor 110. In one embodiment, post 120 may further define a set of radial slots 102 formed in entry slot 122. In one embodiment, radial slots 102 may be adapted to slidingly receive a set of flanges 142 (e.g., hooks, tangs, etc.) on insert 140, thereby securing a position of insert 140 in post 120. In one embodiment, set of radial slots 102 may have a dovetail shape and set of flanges 142 may have a complementary dovetail shape. In one embodiment, insert 140 may include a set of bucket ridges 145 adapted to complement axial ridges 125 so as to form a substantially continuous circumferential surface about rotor 110. In one embodiment, insert 140 and set of bucket ridges 145 match a shape of post 120. In one embodiment, insert 140 may substantially complete both an aft tangential dovetail slot 111 and a forward tangential dovetail slot 115. In one embodiment, insert 140 may be inserted in entry slot 122 to complete assembly of a given stage.

Figure 4:
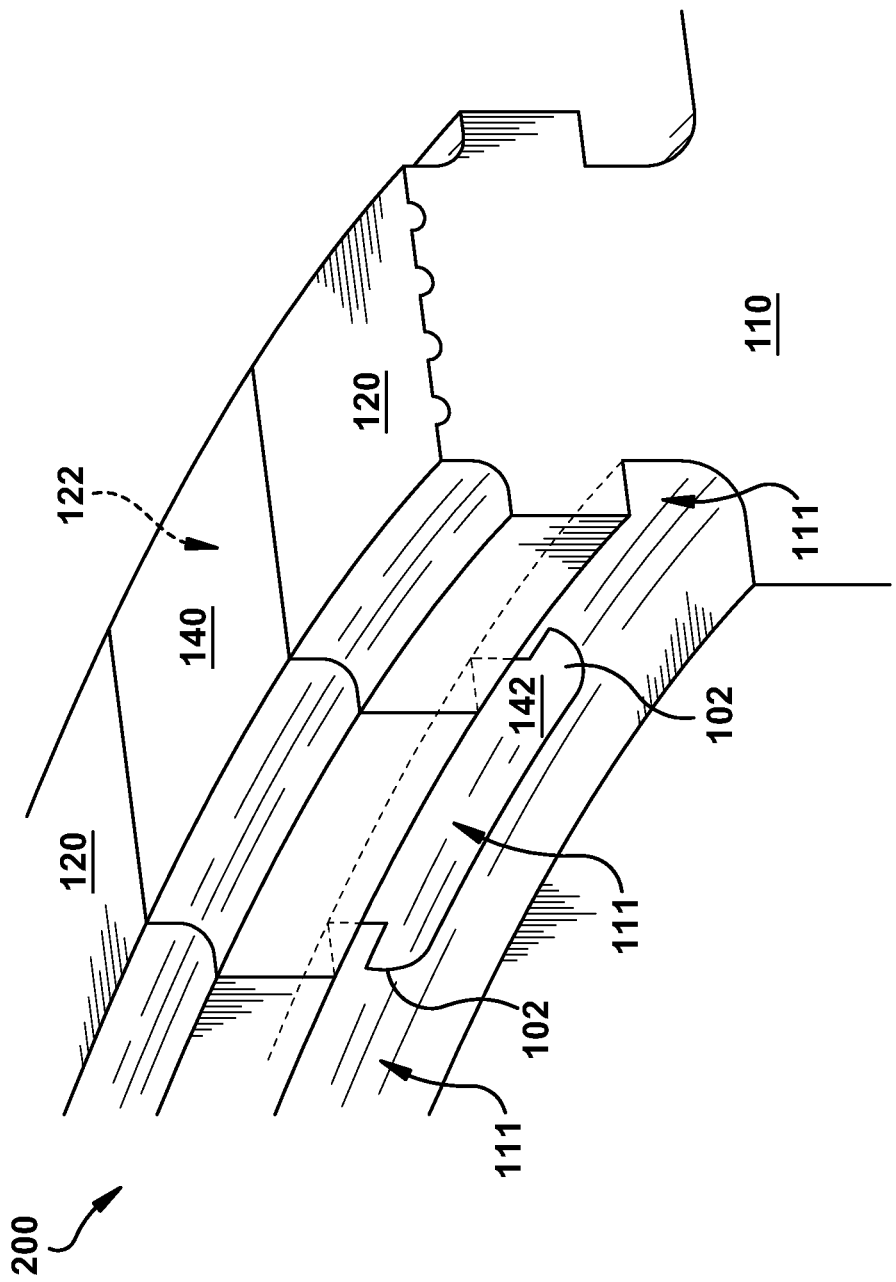
FIG. 4 shows a three-dimensional perspective view of portions of a turbine according to an embodiment of the invention.

Turning to FIG. 4, a schematic three-dimensional perspective view of turbine 200 is shown with insert 140 disposed within entrance slot 122 according to embodiments. In this embodiment, insertion of insert 140 in entry slot 122 (which is obstructed by insert 140) forms a substantially continuous circumferential hook slot 114 about rotor 110. In one embodiment, insert 140 may be constrained radially and circumferentially by post 120.

Figure 5:
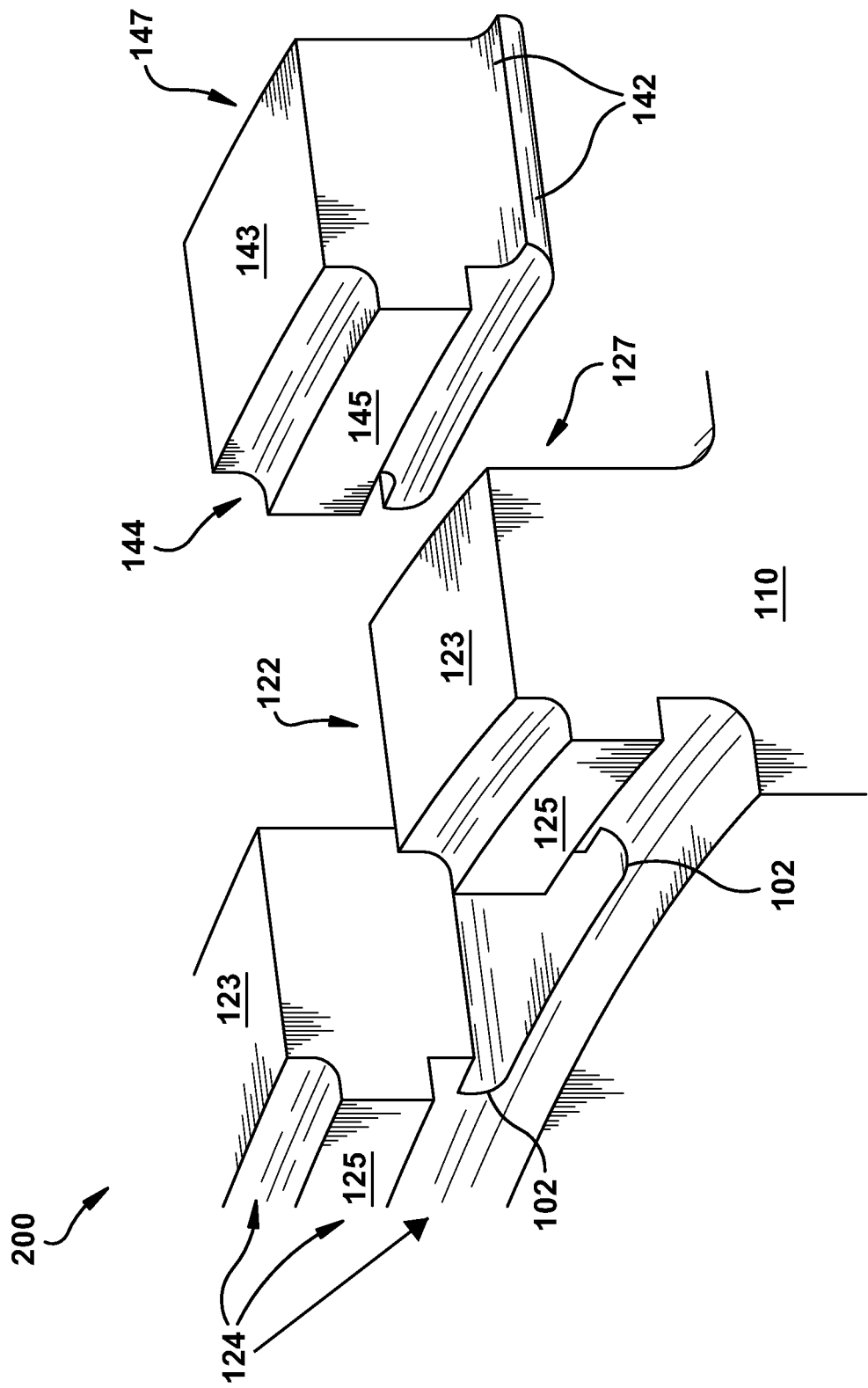
FIG. 5 shows a three-dimensional perspective view of portions of a turbine according to an embodiment of the invention.
Figure 6:
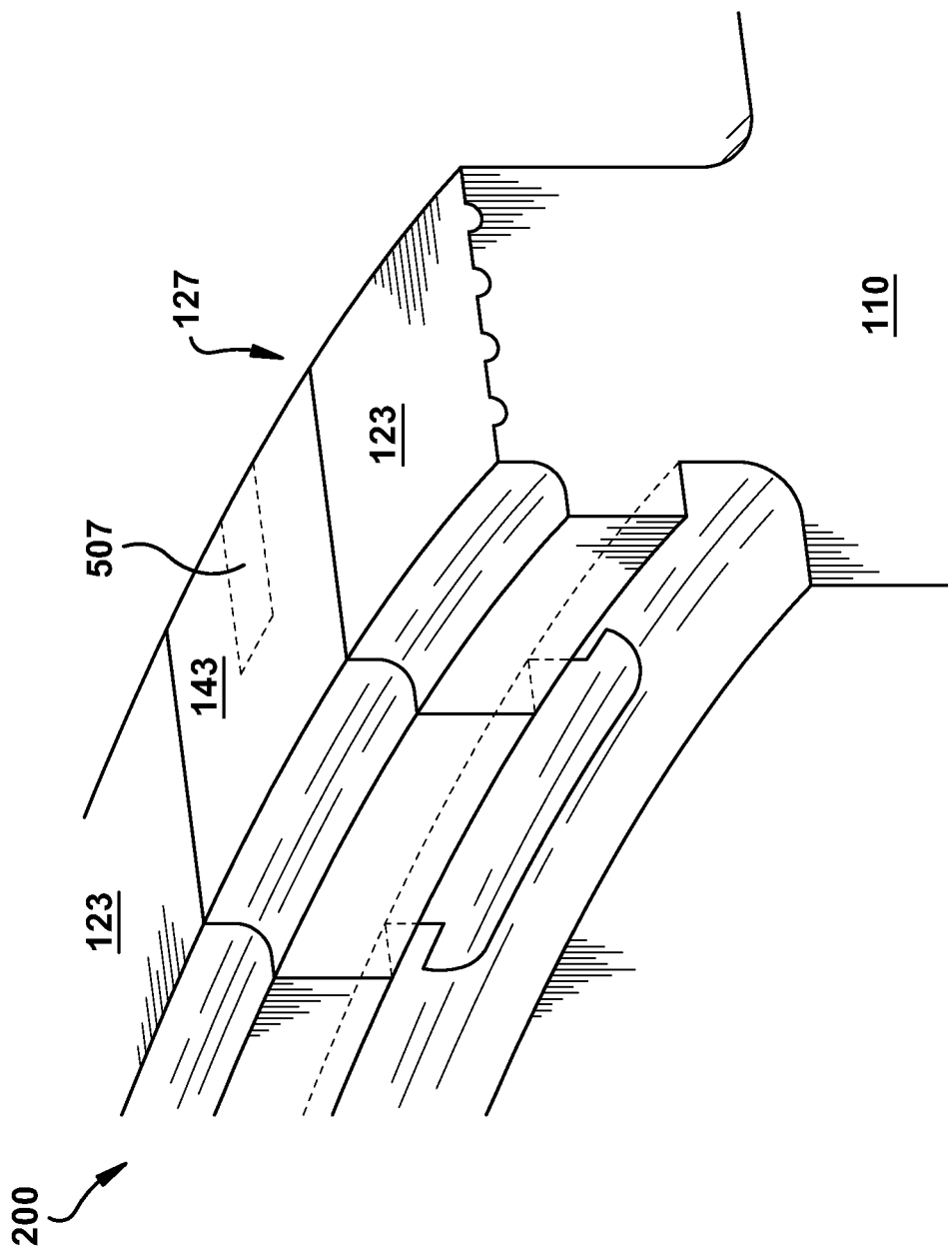
FIG. 6 shows a three-dimensional perspective view of portions of a turbine according to an embodiment of the invention.

Turning to FIG. 5, a three-dimensional perspective view of portions of turbine 200 is shown including rotor 110 and end post 123 according to embodiments of the invention. In this embodiment, end post 123 includes an inner axial face 124 which faces other sets of posts 120 on rotor 110 and includes an axial ridge 125. End post 123 further includes a second axial face 127 which may be substantially planar in shape. In one embodiment, a unidirectional insert 143 may be installed in entry slot 122 of end post 123. Unidirectional insert 143 including a planar face 147 and a ridge face 144 which includes a bucket ridge 145 (e.g., hook, tang, etc.). As can be seen in FIG. 6, installation of unidirectional insert 143 in end post 123 forms a substantially continuous circumferential end post 123 about rotor 110. End post 123 including a planar surface 127, and a ridged surface 125 adapted to secure turbine buckets 93. In one embodiment, unidirectional insert 143 may include a grub screw 507 (shown in phantom) adapted to connect to rotor 110 and/or post 123. It is understood that unidirectional insert 143 may be retained in entry slot 122 using any now known or later developed techniques.

Figure 7:
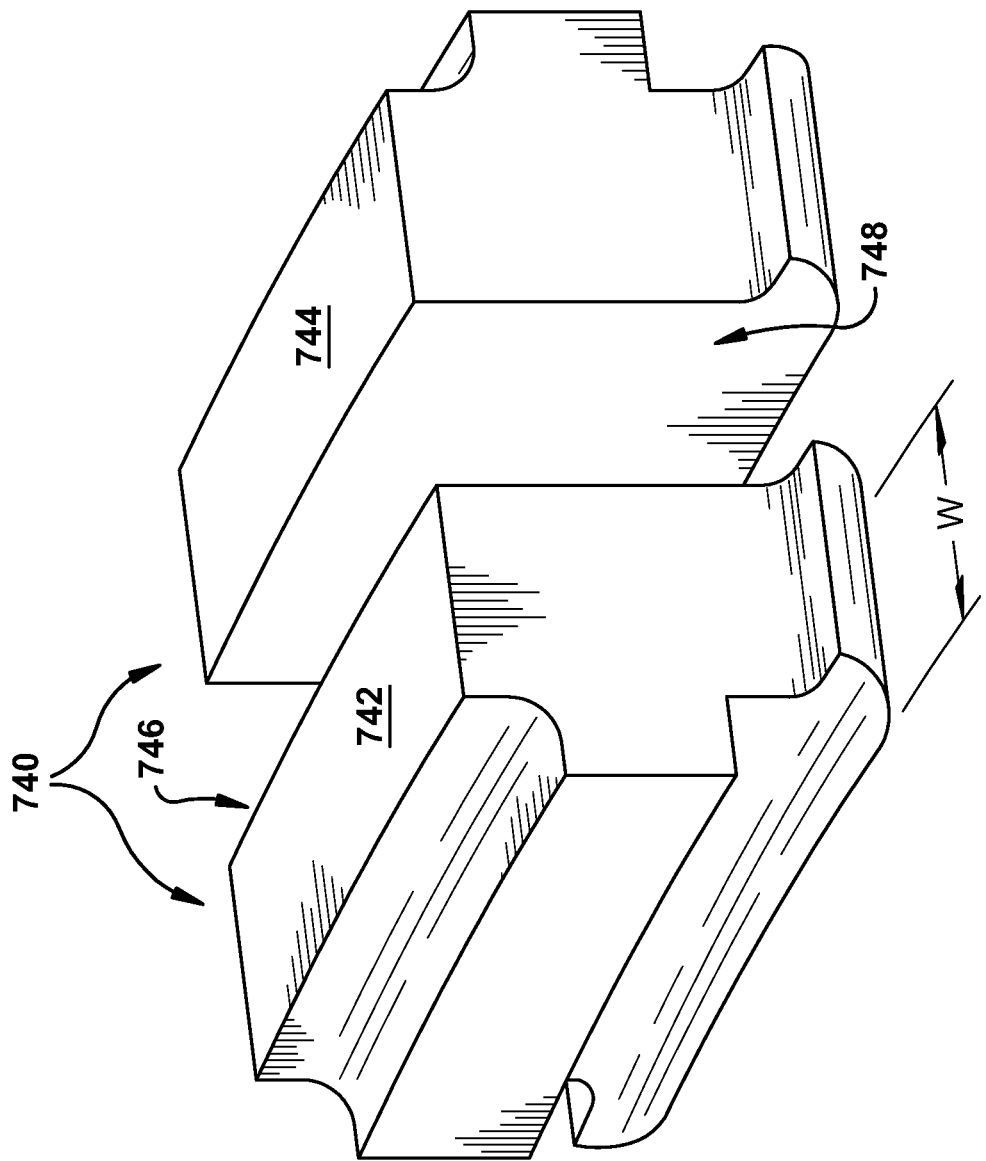
FIG. 7 shows a three-dimensional perspective view of portions of an insert according to an embodiment of the invention.

Turning to FIG. 7, a three-dimensional perspective view of a sectional insert 740 is shown according to embodiments. In this embodiment, sectional insert 740 may include a first subsection 742 with a first mating surface 746, and a second subsection 744 with a second mating surface 748. First subsection 742 and second subsection 744 may be distinct, separable portions of sectional insert 740 which may be individually installed in rotor 110. In one embodiment, first subsection 742 and second subsection 744 may be retained in rotor 110 and/or entry slot 122 via adjacent components. In one embodiment, first subsection 742 may comprise an upstream section adapted to face a flow of working fluid, and second subsection 744 may comprise a downstream section adapted to face away from a flow of working fluid. In one embodiment, first subsection 742 and second subsection 744 may be assembled in entry slot 122 (shown in FIG. 2) to form sectional insert 740. In one embodiment, first mating surface 746 and second mating surface 748 may directly connect. In one embodiment, first mating surface 746 and second mating surface 748 may be adapted to complement one another. In one embodiment, individual installation of first subsection section 742 and second subsection 744 may enable installation of sectional insert 740 into a post 120 on rotor 110 which does not have an insert accessible entry slot 122. In one embodiment, sectional insert 740 may include a plurality of sections. In one embodiment, an axial width "W" of subsection 742 and/or 746 may be less than a dimension "d" (shown in FIG. 8) between posts 120, thereby enabling insertion and assembly of sectional insert 740 in entry slot 822.

Figure 8:
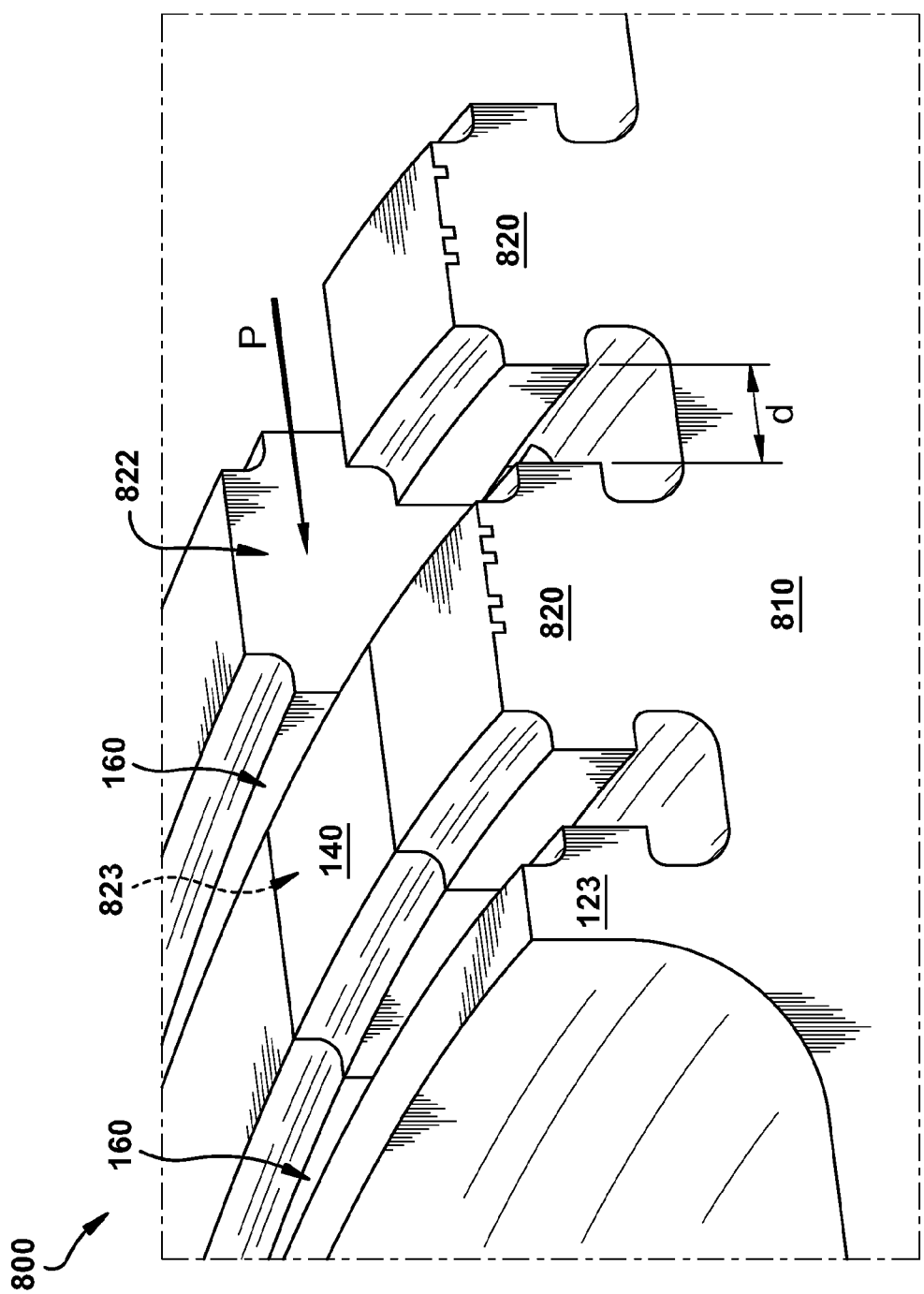
FIG. 8 shows a three-dimensional perspective view of portions of a turbine according to an embodiment of the invention.

Turning to FIG. 8, a three-dimensional perspective view of portions of a turbine 800 including a rotor 810 including a set of posts 820 is shown according to embodiments of the invention. In this embodiment, a first entry slot 822 is axially aligned with a second entry slot 823 such that insert 140 may be positioned at any point and/or in any entry slot 822 or 823 on rotor 810. This enables installation of inserts 140 into posts 820 where circumferential slots 160 have a width "d" which is smaller than width W of insert 140. In this embodiment, insert 140 is inserted into entry slot 123 through entry slot 122 via installation path "P." It is understood that insert 140 may be installed through any number of axially aligned entry slots.

Figure 9:
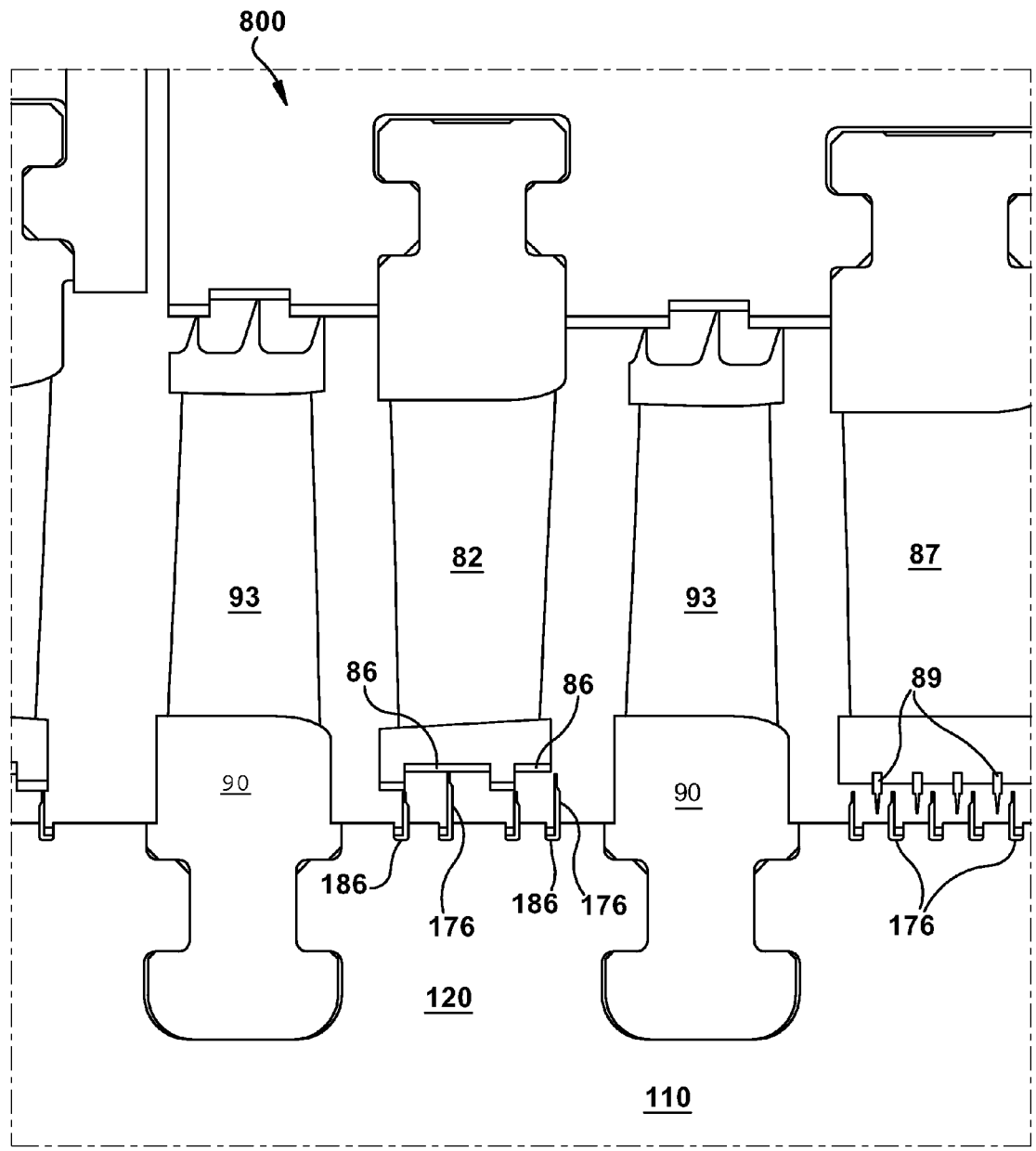
FIG. 9 shows a cut-away schematic view of portions of a turbine according to an embodiment of the invention.

Turning to FIG. 9, a cut away side view of portions of a turbine 800 including a set of nozzles 82 and 87, and turbine buckets 93 is shown according to embodiments of the invention. In this embodiment, nozzle 82 may include an abradable coating 86 adapted to complement a set of seal components 176 connected to post 120. In one embodiment, set of seal components 176 may include a set of conventional J-seal strips connected to post 120. In one embodiment set of seal components 176 may be connected to post 120 via a caulking wire 186. In one embodiment, set of seal components 176 may contact abradable coating 86. In another embodiment, set of seal components 176 may be disposed substantially proximate abradable coating 86. In one embodiment, abradable coating 86 and set of seal components 176 may form a labyrinth seal and/or a conventional J-seal. In one embodiment, nozzle 87 may include a set of nozzle seal teeth 89 adapted to complement and/or oppose set of seal components 176 so as to form a labyrinth seal.

Figure 10:
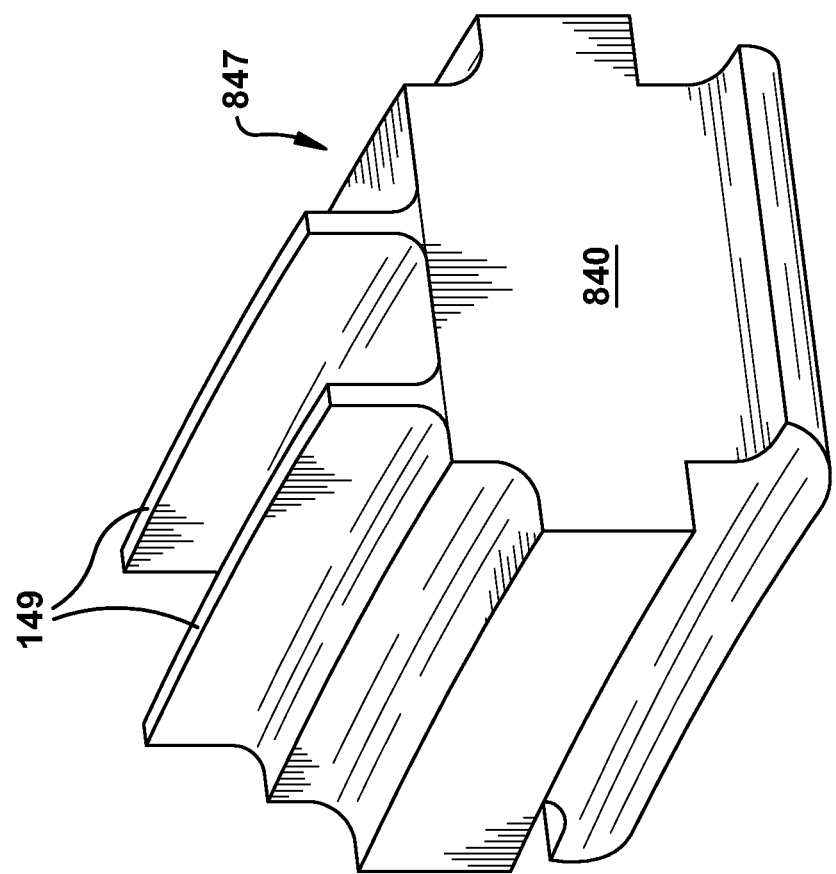
FIG. 10 shows a three-dimensional perspective view of portions of an insert according to an embodiment of the invention.

Turning to FIG. 10, a three-dimensional perspective view of a seal insert 840 is shown according to embodiments of the invention. In this embodiment, seal insert 840 includes a set of insert seal teeth 149 on a radial surface 847. Insert seal teeth 149 are adapted to complement abradable coating 86 and/or set of nozzle seal teeth 89 (shown in FIG. 9) so as to form an axial seal. In one embodiment, seal insert 840 may substantially maintain an axial seal about a circumference of rotor 110. In one embodiment, insert seal teeth 149 may contact abradable coating 86 and/or set of nozzle seal teeth 89.

Figure 11:
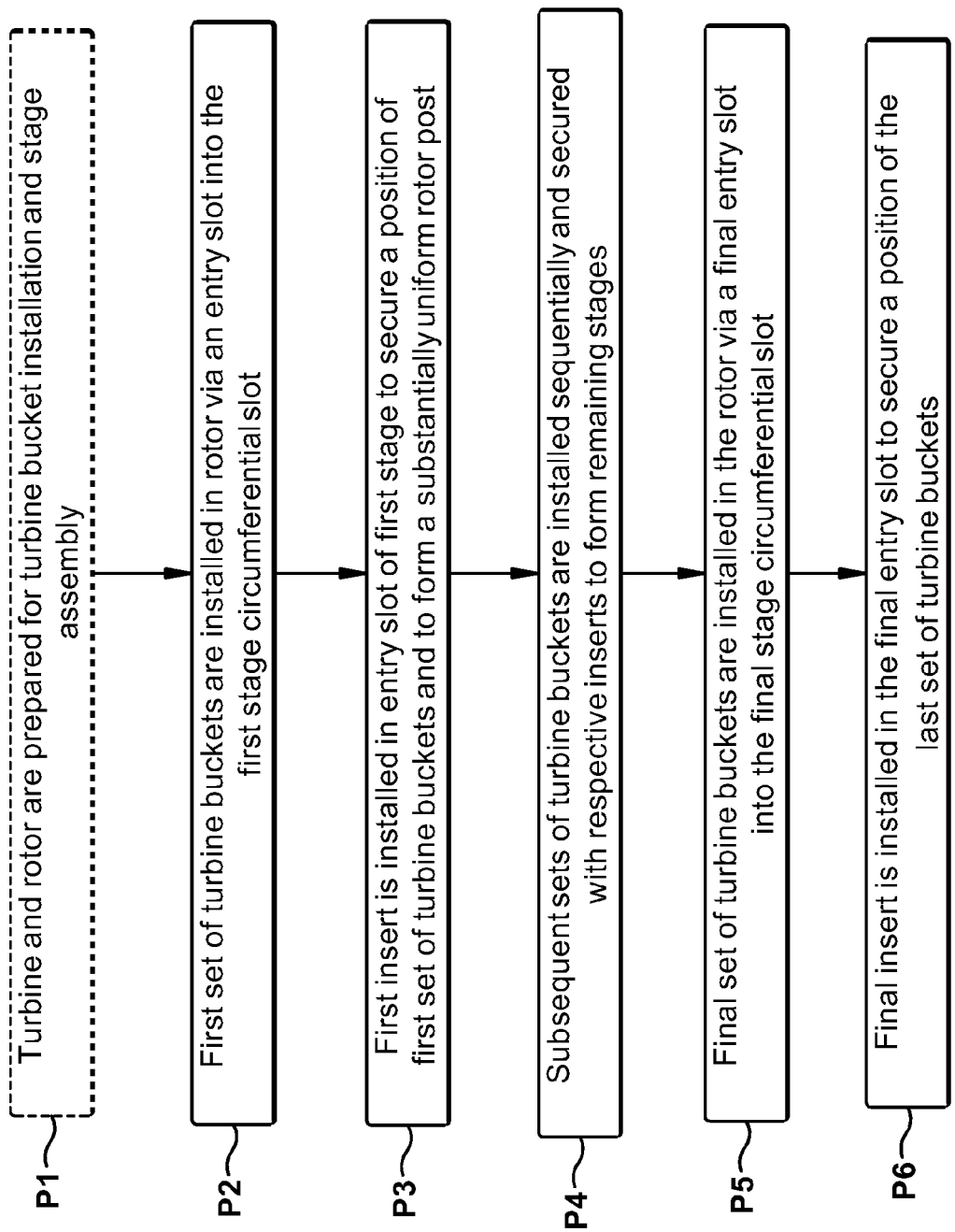
FIG. 11 shows a method flow diagram illustrating a process according to embodiments of the invention.

Turning to FIG. 11, an illustrative method flow diagram is shown according to embodiments of the invention: In preliminary process P1 (shown in phantom), turbine 200 and rotor 110 are prepared for installation and stage assembly of a plurality of turbine buckets 93. This may be done by technicians and/or machinery in response to a scheduled or a user prompted assembly process, and may include removal and/or separation of an outer shell of turbine 200. Following process P1, in process P2, a first set of turbine buckets 93 are installed in rotor 110 via a first entry slot 122 which provides access to a first circumferential slot 160 through a post 120. Specifically, first set of turbine buckets 93 are sequentially installed in the first circumferential slot 160. In one embodiment, first set of turbine buckets 93 may be slidingly received by first circumferential slot 160. First set of turbine buckets 93 are placed adjacent one another such that first set of turbine buckets 93 form an assembly (e.g. first stage) about first circumferential slot 160 and rotor 110. Following process P2, in process P3, a first insert 140 is installed in first entry slot 122 to secure a position of first set of turbine buckets 93 and to complete/form a substantially uniform post 120 about rotor 110. In one embodiment, first insert 140 may be installed as a set of individual sections (e.g. upstream section 142 and downstream section 144). In another embodiment, first insert 140 may be installed via an entry slot 122 which runs through a series of posts 120 on rotor 110. In one embodiment, first insert 140 may be radially and circumferentially secured by post 120. Following process P3, in process P4, subsequent sets of turbine buckets 93 are sequentially installed in subsequent circumferential slots 160 about rotor 110. These subsequent sets of turbine buckets 93 are secured by respective inserts 140 and form the remaining stages of turbine 200. In one embodiment, all stages and/or turbine buckets 93 may be installed in rotor 110 via entry slot 122 which forms a linearly aligned entry slot 122 through all posts 120. Following process P4, in process P5, a final set of turbine buckets 93 are installed in a final stage circumferential slot 160 via a final entry slot 122. The final set of turbine buckets 93 form the final stage of turbine 200. Following process P5, in process P6, a final insert 143 is installed in final entry slot 122 to secure a position of the final set of turbine buckets 93. In one embodiment, final insert 143 may include a grub screw 507 which is adjusted to secure final insert 143 to rotor 110 and/or turbine 200.

The data flow diagram and block diagrams in the FIGURES illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 12:
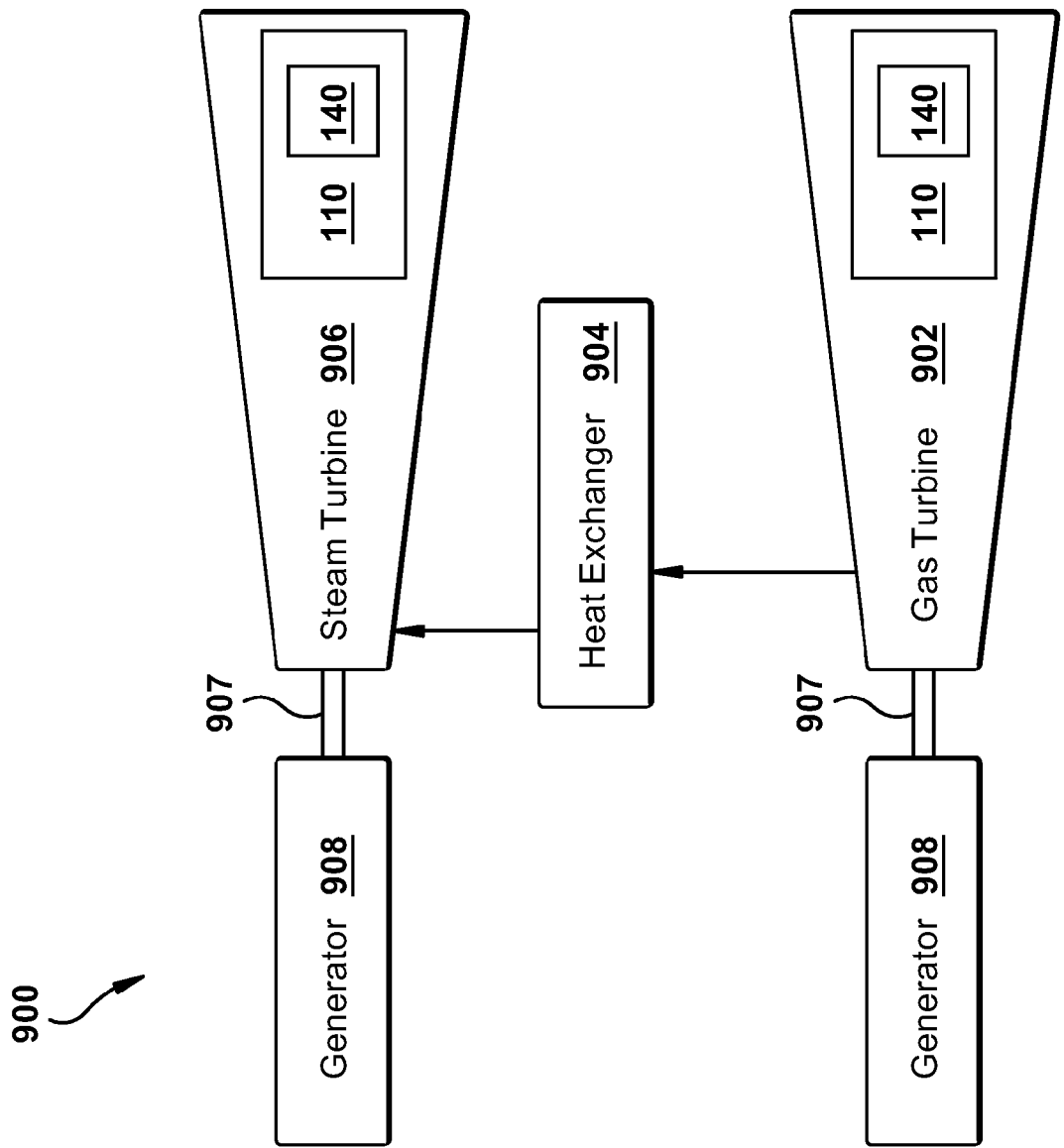
FIG. 12 shows a schematic block diagram illustrating portions of a combined cycle power plant system according to embodiments of the invention.
Figure 13:
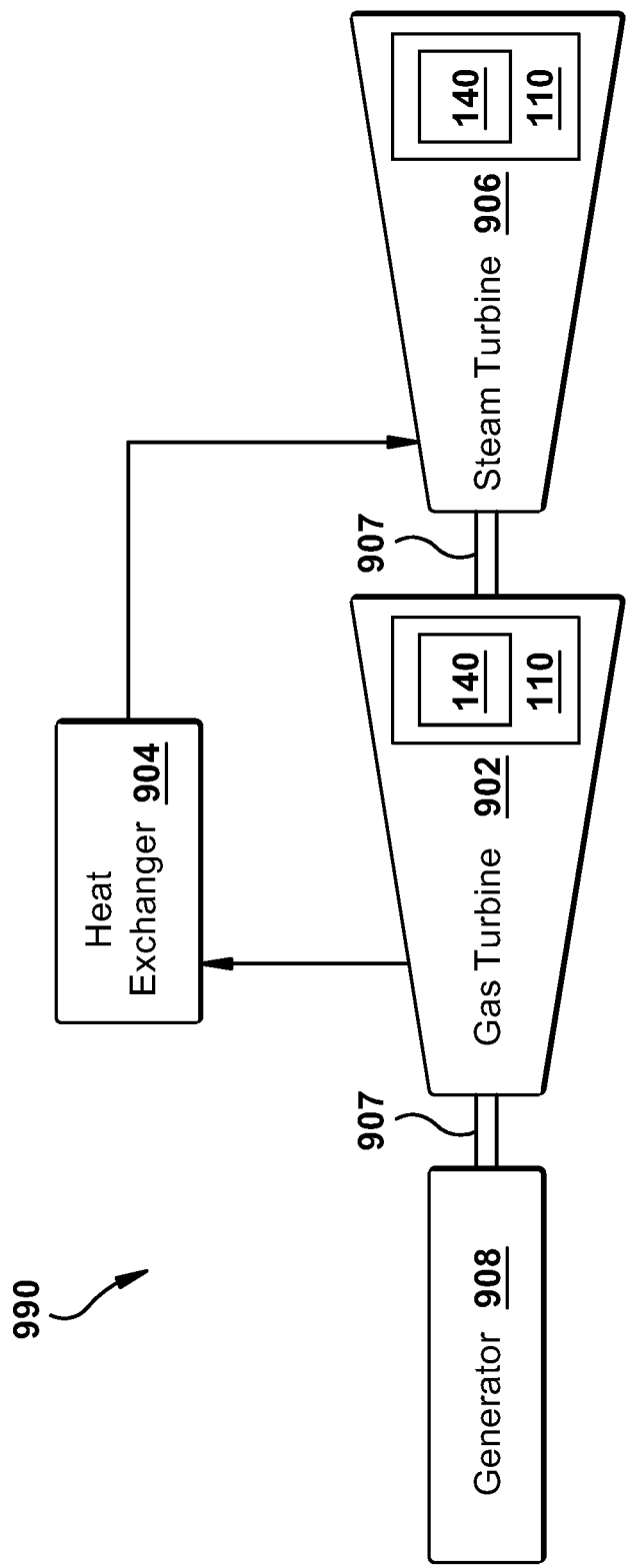
FIG. 13 shows a schematic block diagram illustrating portions of a single-shaft combined cycle power plant system according to embodiments of the invention.

Turning to FIG. 12, a schematic view of portions of a multi-shaft combined cycle power plant 900 is shown. Combined cycle power plant 900 may include, for example, a gas turbine 902 operably connected to a generator 908. Generator 908 and gas turbine 902 may be mechanically coupled by a shaft 907, which may transfer energy between a drive shaft (not shown) of gas turbine 902 and generator 908. Also shown in FIG. 12 is a heat exchanger 904 operably connected to gas turbine 902 and a steam turbine 906. Heat exchanger 904 may be fluidly connected to both gas turbine 902 and a steam turbine 906 via conventional conduits (numbering omitted). Gas turbine 902 and/or steam turbine 906 may include drum rotor 110 and/or insert 140 of FIG. 2 or other embodiments described herein. Heat exchanger 904 may be a conventional heat recovery steam generator (HRSG), such as those used in conventional combined cycle power systems. As is known in the art of power generation, HRSG 904 may use hot exhaust from gas turbine 902, combined with a water supply, to create steam which is fed to steam turbine 906. Steam turbine 906 may optionally be coupled to a second generator system 908 (via a second shaft 907). It is understood that generators 908 and shafts 907 may be of any size or type known in the art and may differ depending upon their application or the system to which they are connected. Common numbering of the generators and shafts is for clarity and does not necessarily suggest these generators or shafts are identical. In another embodiment, shown in FIG. 13, a single shaft combined cycle power plant 990 may include a single generator 908 coupled to both gas turbine 902 and steam turbine 906 via a single shaft 907. Steam turbine 906 and/or gas turbine 902 may include drum rotor 110 and/or insert 140 of FIG. 2 or other embodiments described herein.

The inserts and rotors of the present disclosure are not limited to any one particular turbine, power generation system or other system, and may be used with other power generation systems and/or systems (e.g., combined cycle, simple cycle, nuclear reactor, etc.). Additionally, the inserts and rotors of the present invention may be used with other systems not described herein that may benefit from the stability, ease of installation and securing ability described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An insert comprising:
   a base portion adapted to complement an entry slot in a rotor of a turbine;
   a neck portion extending radially outboard from the base portion, the neck portion being adapted to complement a post of the rotor to form a substantially continuous dovetail about the rotor; and
   a set of seal teeth extending radially outboard from the neck portion, the set of seal teeth adapted to form a seal with a set of seal components on a nozzle.

2. The insert of claim 1, wherein the neck portion includes a set of bucket ridges on both a first face and a second face, the set of bucket ridges adapted to complement a set of ridges on the post to form a set of circumferential hooks for a set of turbine buckets.

3. The insert of claim 1, wherein a first part of the base portion and a first part of the neck portion form a subsection of the insert, and a second part of the base portion and second part of the neck portion form a second subsection of the insert, wherein the first subsection and the second subsection of the insert are separable.

4. The insert of claim 1, wherein at least one of the neck portion or the base portion includes an aperture adapted to receive a grub screw.

5. The insert of claim 1, wherein the neck portion includes an axial face with a substantially planar surface.

6. The insert of claim 1, wherein the base portion has a dovetail shape adapted to complement a dovetail in the entry slot.

7. A turbine, comprising:
   a stator;
   a working fluid passage substantially surrounded by the stator; and
   a rotor configured radially inboard of the working fluid passage and defining a set of entry slots and a set of circumferential slots, the rotor including:
      a set of turbine buckets connected to the rotor via the set of circumferential slots; and
      a set of inserts adapted to complement the set of entry slots and substantially secure a position of the set of turbine buckets in the set of circumferential slots, wherein the set of inserts include a set of seal teeth extending radially outboard, the set of seal teeth adapted to form a seal with a set of seal components on a nozzle.

8. The turbine of claim 7, wherein each insert in the set of inserts includes:
   a base portion adapted to complement an entry slot in the set of entry slots; and
   a neck portion extending radially outboard from the base portion, the neck portion adapted to complement a post of the rotor to form a substantially continuous dovetail about the rotor.

9. The turbine of claim 7, wherein the set of inserts include a set of bucket ridges on both a first face and a second face, the set of bucket ridges adapted to complement a set of ridges on the post to form a set of circumferential hooks to secure the set of turbine buckets.

10. The turbine of claim 7, wherein each insert in the set of inserts includes a first subsection and a second subsection which are separable.

11. The turbine of claim 7, wherein at least one insert is connected to the rotor via a screw.

12. The turbine of claim 7, wherein at least one insert in the set of inserts includes an axial face with a substantially planar surface.

* * * * *